(12) United States Patent
Bruette

(10) Patent No.: US 7,780,564 B2
(45) Date of Patent: Aug. 24, 2010

(54) AUTOMATIC TRANSMISSION HYDRAULIC LINE PRESSURE REGULATOR

(75) Inventor: Randolph H. Bruette, Abingdon, MD (US)

(73) Assignee: ATI Performance Products Inc., Baltimore, MD (US)

( * ) Notice: Subject to any disclaimer, the term of this patent is extended or adjusted under 35 U.S.C. 154(b) by 616 days.

(21) Appl. No.: 11/878,627

(22) Filed: Jul. 25, 2007

(65) Prior Publication Data

US 2008/0026912 A1 Jan. 31, 2008

Related U.S. Application Data

(60) Provisional application No. 60/832,938, filed on Jul. 25, 2006.

(51) Int. Cl.
*F16K 25/00* (2006.01)
(52) U.S. Cl. ...................................... 475/116
(58) Field of Classification Search ............ 475/91, 475/93, 94, 116, 120, 127, 130
See application file for complete search history.

(56) References Cited

U.S. PATENT DOCUMENTS

| 4,150,809 A | * | 4/1979 | Muller | ............... | 251/149.4 |
| 5,603,348 A | * | 2/1997 | Geringer | ............... | 137/514.7 |
| 7,273,434 B1 | * | 9/2007 | Rossler | ............... | 475/116 |
| 2007/0167267 A1 | * | 7/2007 | Long et al. | ............... | 475/116 |

* cited by examiner

*Primary Examiner*—Sherry L Estremsky
*Assistant Examiner*—Edwin A. Young
(74) *Attorney, Agent, or Firm*—Timothy J. Klima; Shuttleworth & Ingersoll, PLC

(57) ABSTRACT

An automatic transmission line pressure regulator includes a first body for installation in a valve bore distant from a line pressure valve and having a threaded bore passing therethrough, a threaded adjuster axially engaged in the threaded bore and rotationally adjustable with respect to the first body, a second body for installation in the valve bore and engagement with the threaded adjuster and a spring for installation between and engagement with the second body and the line pressure valve. Rotation of the threaded adjuster with respect to the first body alters an axial position of the adjuster, the second body and a first end of the spring, thereby altering a pre-load on the spring to alter a resistive force against movement of the line pressure valve caused by line pressure, and thusly, regulates line pressure.

18 Claims, 6 Drawing Sheets

AUTOMATIC TRANSMISSION HYDRAULIC LINE PRESSURE REGULATOR

This application claims priority to U.S. Provisional Application No. 60/832,938, filed Jul. 25, 2006, which application is incorporated by reference herein.

BACKGROUND

The present invention relates to automatic transmissions, and more specifically, to an adjustable pressure regulator for adjusting a hydraulic pressure in a hydraulic circuit of an automatic transmission.

In known automatic transmissions, such as the General Motors® Powerglide® automatic transmission, a hydraulic line pressure in the transmission is used to set the clamping force of clutch packs in the transmission. This line pressure can be changed to compensate for various factors relating to the vehicle configuration and use. In standard road use, such line pressures were set at the factory, generally were set in a range of 120-130 psi, and were never changed. Higher pressures provided more clamping force for the clutch packs and resulted in less likelihood of slippage through the clutch packs.

This transmission has been out of production since the early 1970's, but nonetheless continues to be very popular because of its consistency and simplicity and is still widely used in drag racing and some other off-road competitions. As the vehicles used in such drag racing are often extensively modified, and the vehicles are not used for any other purpose than drag racing, it is advantageous if the line pressure can be set to function best for the particular vehicle in which the transmission is to be installed. This involves considering several factors, including, among other things, horsepower/torque of the engine, weight of the vehicle and driveline drive ratios. The line pressure, for such racing application transmissions, is now generally set by the transmission rebuilder according to the factors noted above. The optimal setting of the hydraulic line pressure can vary from vehicle to vehicle, based on the above factors, and is desirably capable of fine tuning (fine adjustment) to optimize the setting for the vehicle. Powerglide® drag racing transmissions generally have line pressures set at between 140-230 psi to handle the greater torque transmitted through the transmission. While higher line pressures can be desirable to increase the holding power of the clutch packs, setting the pressure higher than is necessary for the specific vehicle wastes engine power that could otherwise be used to drive the vehicle forward. Thus, pressures that are set too high for the particular vehicle can decrease the performance of the vehicle by shunting propelling engine power to create unnecessarily high line pressures. Generally then, the specific vehicle performance will be maximized by setting the line pressure at the least pressure that will prevent clutch pack slippage for the specific vehicle. Setting the line pressure any higher wastes engine power that could otherwise be propelling the vehicle.

The Powerglide® transmission uses an elongated, axially movable line pressure valve to regulate line pressure in the transmission. Hydraulic fluid from the transmission pump is connected to a first end of the line pressure valve and creates a line pressure against the first end of the line pressure valve. A resistive force is applied to the opposing second end of the line pressure valve to resist this line pressure against the first end of the line pressure valve. The line pressure valve remains in a closed position by the resistive force until the line pressure against the first end of the line pressure valve overcomes the resistive force, whereupon the line pressure valve opens. The higher the resistive force, the higher the line pressure needed to overcome the resistive force. Thus, the line pressure can be adjusted by adjusting the resistive force.

The standard Powerglide® uses two components to set the resistive force, and thus, the line pressure. First, a replaceable boost sleeve and boost valve (piston) combination is connected to a hydraulic boost circuit of the transmission. The boost valve is slideably disposed in the boost sleeve and a first end of the boost valve is exposed to the hydraulic boost circuit. Depending on the pressure in the hydraulic boost circuit and the cross-sectional area of the first end of the boost valve, a resistive force is created on a second end of the boost valve, which engages the second end of the line pressure valve. For purpose of explanation, this resistive force will be called $RF_H$.

In addition, the standard Powerglide® uses a mechanical spring positioned between the boost sleeve and a flange of the line pressure valve (which in practice, can also be some form of retaining ring engaging a circumferential groove in the line pressure valve) to apply a second resistive force against the line pressure valve. This second resistive force will be called $RF_S$. The total resistive force $RF_{TOT}$ acting against the line pressure valve in a standard Powerglide® is thus $RF_{TOT}=RF_H+RF_S$. This $RF_{TOT}$ can be adjusted by the racing transmission rebuilder by varying the size of the cross-sectional area of the first end of the boost valve (usually by replacing the boost sleeve and boost valve in matched pairs of varying boost valve areas), by altering the spring rate of the resistive spring and/or by altering the preload on the resistive spring by the use of fixed spacers used to pre-compress the resistive spring. Usually, various combinations of the above methods are used to set the line pressure to the desired level.

The automatic transmission will now be described in greater detail, with reference to the noted Figs. The automatic transmission 10, such as a Powerglide® transmission shown in FIG. 6, includes a valve body 12 (see also FIG. 2 (Prior Art)) in which a number of hydraulic fluid routing functions are performed. One such function is to control a line pressure valve 14 (see FIG. 1 (Prior Art)) to regulate hydraulic line pressure in the automatic transmission 10. As further shown in the exploded view of FIG. 1 (Prior Art), a conventionally known line pressure regulating system 16 includes a pressure regulating boost sleeve 18 (shown in a sectional view) in which a pressure regulating boost valve 20 is operationally disposed. The boost sleeve 18 includes a port (not shown in communication with a hydraulic boost circuit of the valve body 12 so that a first end 22 of the boost valve 20 is exposed to the hydraulic boost pressure in the pressure regulating boost sleeve 18. The boost valve 20 also includes a second end 24 for engaging a second end 28 of the line pressure valve 14. A first end 26 of the line pressure valve 14 is exposed to the hydraulic line pressure when installed in the valve body 12.

A spring retainer 30 engages the pressure regulating boost sleeve 18 and positions a pressure regulating spring 32 positioned between the spring retainer 30 and a retainer flange 34 of the line pressure valve 14. The retainer flange 34 can be machined or cast as part of the line pressure valve 14 or can be in the form of a retaining ring. A preload spacer 36 can be disposed between the pressure regulating spring 32 and the retainer flange 34. Altering the thickness of the preload spacer 36 alters the preload of the pressure regulating spring 32. A retaining ring 38 engages a circumferential slot in a valve bore 40 (see FIG. 2) of the valve body 12, to retain the pressure regulating system 16 in the valve bore 40.

The conventional line pressure regulating system operates in the following manner. First, the replaceable boost sleeve 18 and boost valve 20 combination is connected to the hydraulic boost circuit of the transmission. The boost valve 20 is slideably disposed in the boost sleeve 18 and the first end 22 of the boost valve 20 is exposed to the hydraulic boost circuit. Depending on the pressure in the hydraulic boost circuit and the cross-sectional area of the first end 22 of the boost valve 20, a resistive force is created on the second end 24 of the boost valve 20, which engages the second end 28 of the line pressure valve 14. This resistive force is $RF_H$.

In addition, the mechanical spring 32 positioned between the spring retainer 30 and the flange 34 of the line pressure valve 14 applies a second resistive force against the line pressure valve, which is $RF_S$. The total resistive force $RF_{TOT}$ acting against the line pressure valve 14 in a standard Powerglide® is thus $RF_{TOT} = RF_H + RF_S$. This $RF_{TOT}$ can be adjusted by the racing transmission rebuilder by varying the size of the cross-sectional area of the first end 22 of the boost valve 20 (usually by replacing the boost sleeve 18 and boost valve 20 in matched pairs of varying boost valve areas), by altering the spring rate of the resistive spring 32 and/or by altering the preload on the resistive spring by the use of various thicknesses of preload spacers 36 to pre-compress the resistive spring 32. Usually, various combinations of the above methods are used to set the line pressure to the desired level.

The first end 26 of the line pressure valve 14 is exposed to the pressurized hydraulic fluid (from the transmission pump) in the line pressure circuit of the valve body 12. This hydraulic line pressure acts on the first end 26 of the line pressure valve 14 to create a valve opening force $F_{VO}$ that acts to open the line pressure valve 14 by moving it to the left (as seen in FIG. 2) in the valve body 12. However, this $F_{VO}$ is being countered by the $RF_{TOT}$. Therefore, the line pressure valve 14 cannot open in the valve body 12 until the $F_{VO}$ has increased to be at, or above, the $RF_{TOT}$, whereupon, the line pressure valve 14 opens, allowing excess line pressure to bleed off. Therefore, as is known, through this system the $F_{VO}$ will be regulated under normal operating conditions to a level of about that of the $RF_{TOT}$, thereby also regulating the line pressure that corresponds to the $F_{VO}$. Increasing the $RF_{TOT}$, through one or more of the techniques noted above, thus increases the regulated line pressure, and correspondingly, decreasing the $RF_{TOT}$, through one or more of the techniques noted above, decreases the regulated line pressure.

There are several disadvantages to the standard approach to regulating the line pressure in a Powerglide® transmission. First, the various components described above that can affect the line pressure cannot be readily removed and replaced in the valve body without removing either the transmission from the vehicle or the valve body from the transmission. This is time consuming and increases the chances of contamination and leakage of the valve body caused by the assembly and reassembly.

Second, a relatively large supply of varied boost sleeve/boost valve pairs, springs and spacers is needed to be able to create the correct combination to derive the desired line pressure. The finer the level of adjustability required, the greater the number of varied components that are needed to be able to derive the desire line pressure setting. This increases inventory costs for maintaining this supply of parts and also increases the complexity of determining the correct combination of parts to derive the desired line pressure. Such complexity can easily push adjustment of the line pressure beyond the capability of the vehicle owner, and prevent the vehicle owner from himself being able to fine tune the line pressure to his particular vehicle to maximize the performance of the vehicle. In fact, at the present time, adjustment of the line pressure in a Powerglide® transmission is not generally considered to be a vehicle owner task.

Further, it is known for the hydraulic portion of the resistive force to be problematic. That is, the boost valve is known to become jammed in the boost sleeve, often through contamination between the boost valve and boost sleeve, thereby either completely eliminating the hydraulic portion of the resistive force if the boost valve jams in a position away from the line pressure valve so that it does not contact the line pressure valve under normal movement of the line pressure valve (thereby leaving the line pressure too low) or by jamming in a position that prevents full movement of the line pressure valve (and thereby causing the line pressure to become higher than desired). This can seriously affect the performance, and even drivability, of the vehicle, and can also damage components of the transmission and vehicle. Resolving this problem requires, at the least, disassembly of the valve body to remove the contamination, and may require replacement of the boost sleeve/boost valve pair if either component has been damaged.

SUMMARY OF THE INVENTION

An automatic transmission hydraulic line pressure regulator includes a spring having a first end and a second end, the second end for engaging a portion of a line pressure valve installed in a valve bore of a valve body of the automatic transmission and axially movable, under influence of the line pressure exposed to a portion of the line pressure valve opposite the portion engaging the spring, between a closed position in a direction away from the spring and an open position in a direction toward the spring. The spring resists an opening force exerted on the line pressure valve by the line pressure and movement of the line pressure valve from the closed position. A first body is installable and removably fixable in the valve bore distant from the line pressure valve, the first body having a first side positioned toward an exterior of the valve body and a second side positioned toward an interior of the valve body. The first body has a threaded bore passing through the first body from the first body first side to the first body second side. A threaded adjuster axially engages the threaded bore of the first body and is rotationally adjustable with respect to the first body to alter an axial position of the threaded adjuster with respect to the first body. A first end of the threaded adjuster is accessible from an exterior of the valve body for rotational adjustment. A second body is installable in the valve bore between the threaded adjuster and the spring and has a first side for engaging a second end of the threaded adjuster and a second side for engaging the first end of the spring.

Rotational adjustment of the threaded adjuster with respect to the first body alters both an axial position of the second body and an axial position of the first end of the spring, thereby altering a pre-load on the spring to alter a resistive force against movement of the line pressure valve caused by the line pressure, such that increasing the pre-load on the spring by inward axial movement of the threaded adjuster increases the line pressure because the line pressure valve is prevented from opening and bleeding off further line pressure until the line pressure has increased to a level that the opening force can overcome the increased spring resistive force to open the line pressure valve. Correspondingly, decreasing the pre-load on the spring by outward axial movement of the threaded adjuster decreases the line pressure.

It is a specific object of the present invention to overcome the above noted problems of the standard Powerglide® line pressure regulating system.

It is a further object of the present invention to provide a line pressure regulating system for an automatic transmission that is adjustable without disassembling the valve body from the transmission or the transmission from the vehicle.

It is a further object of the present invention to provide a line pressure regulating system for an automatic transmission that is adjustable within a given range without requiring replacement of various system components.

It is a further object of the present invention to provide a line pressure regulating system for an automatic transmission that is generally continuously adjustable within a given range.

It is a further object of the present invention to provide a line pressure regulating system for an automatic transmission that is generally continuously adjustable within a given range using only basic hand tools.

It is a further object of the present invention to provide a line pressure regulating system for an automatic transmission that is generally adjustable in the vehicle by the vehicle mechanic or owner.

It is a further object of the present invention to provide a line pressure regulating system for an automatic transmission that is adjustable without removal of the transmission pan, via an access port in the transmission pan.

It is a further object of the present invention to provide a line pressure regulating system for an automatic transmission that reduces the risk of line pressure maladjustment because of the failure of pressure adjustment components to operate properly.

It is a further object of the present invention to provide a line pressure regulating system for an automatic transmission that is adjustable within a given range without use of a hydraulic resistive force component.

It is a further object of the present invention to provide a line pressure regulating system for an automatic transmission that is precisely adjustable on a test rig without requiring disassembly of the valve body and/or replacement of components.

These and other objects of the present invention will be apparent from the attached description of the invention, including the figures.

The invention will be described in further detail below in conjunction with the attached figures, wherein like reference numerals indicate like components.

DETAILED DESCRIPTION

Figure 1:
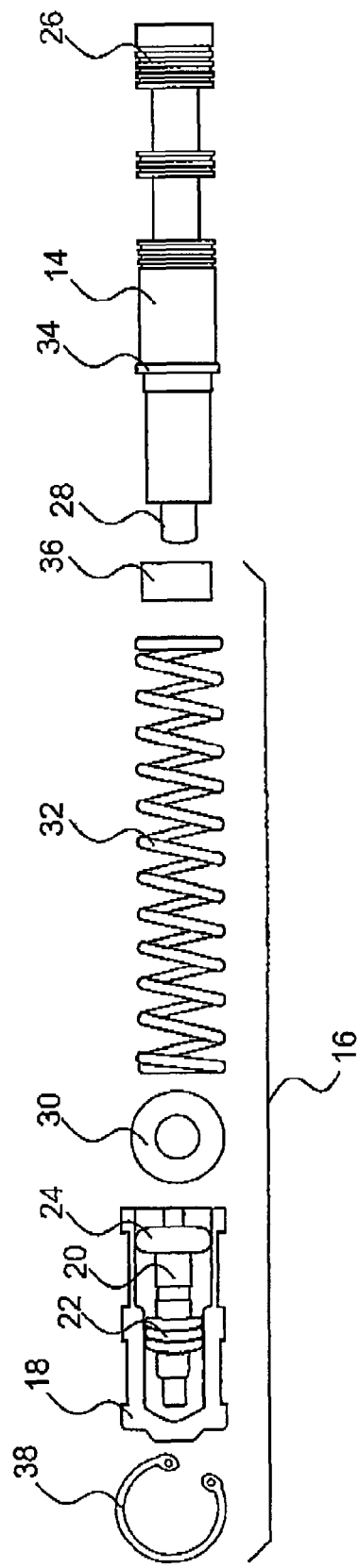
FIG. 1 (Prior Art) is an exploded view of a line pressure valve and line pressure regulating system for a Powerglide® automatic transmission.
Figure 2:
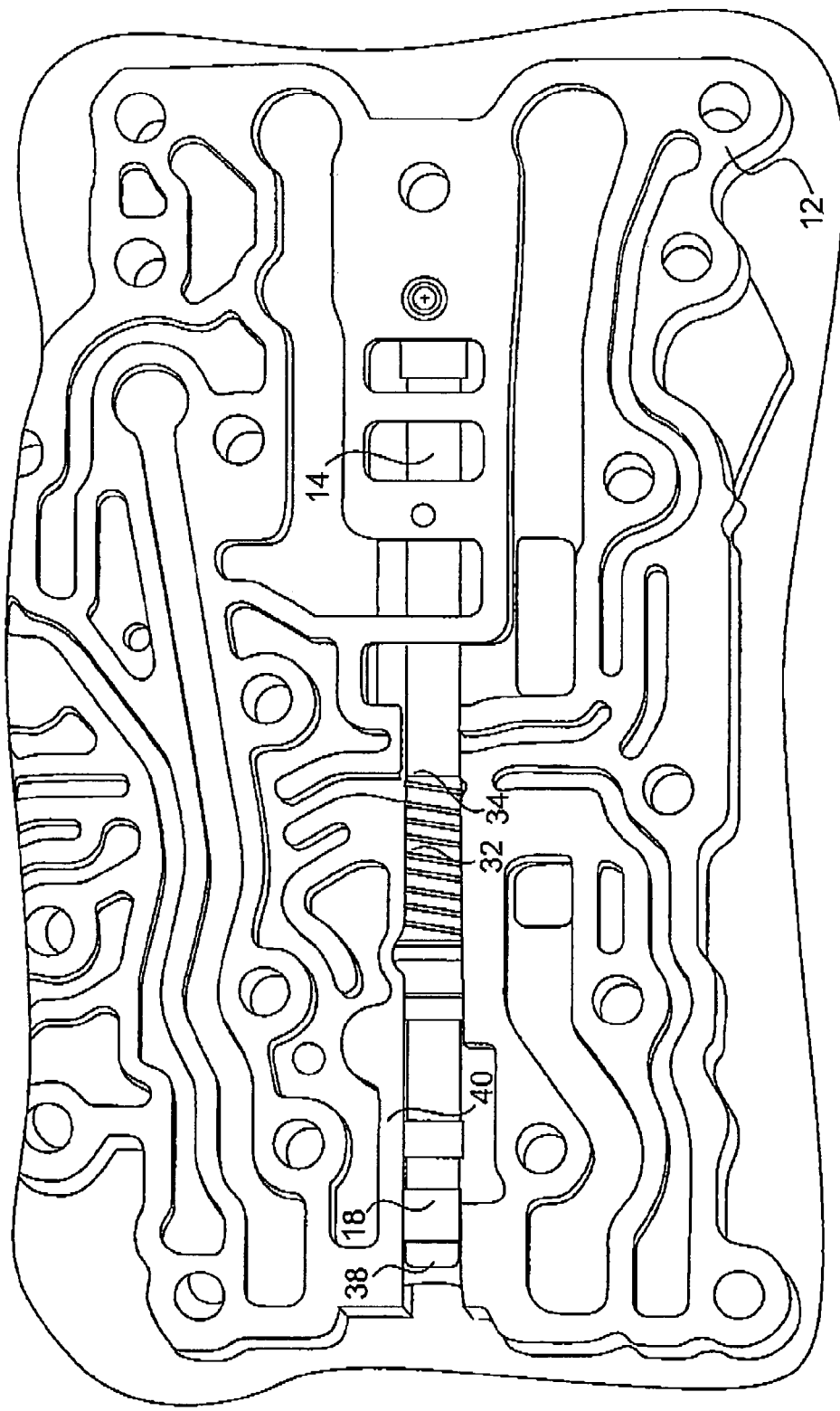
FIG. 2 (Prior Art) is a partial sectional view of a valve body of a Powerglide® automatic transmission with the line pressure valve and line pressure regulating system installed.
Figure 3:
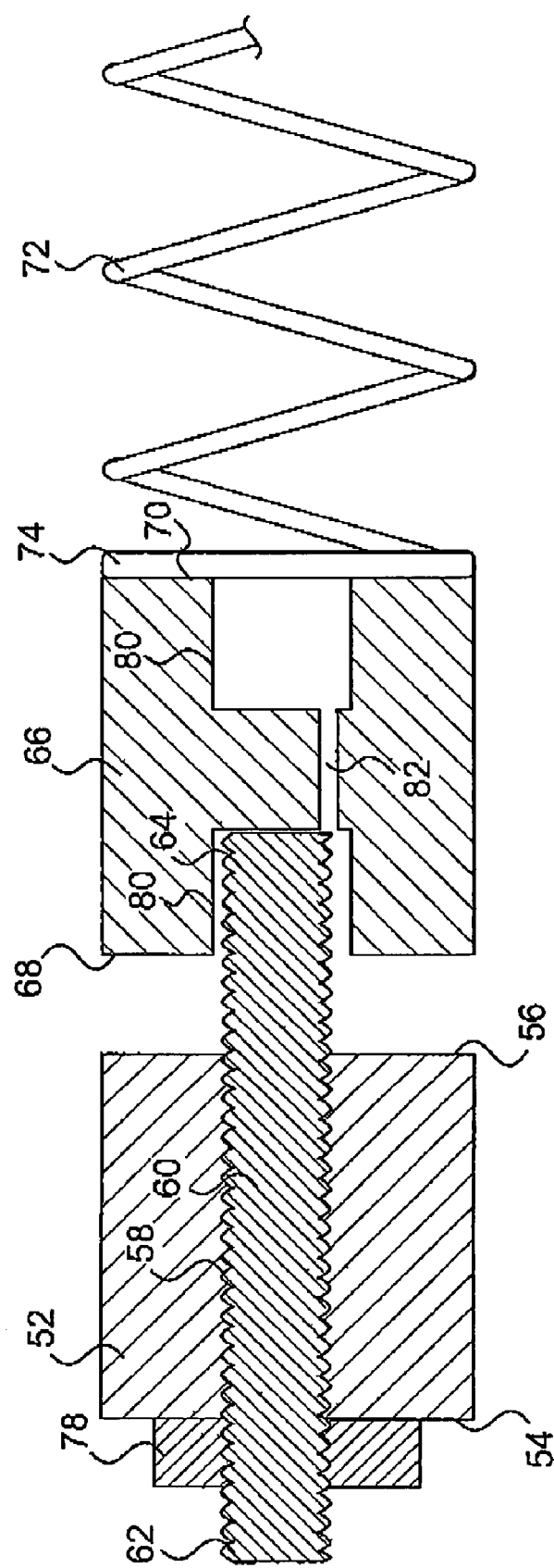
FIG. 3 is a sectional view of the line pressure regulating system of the present invention.
Figure 4:
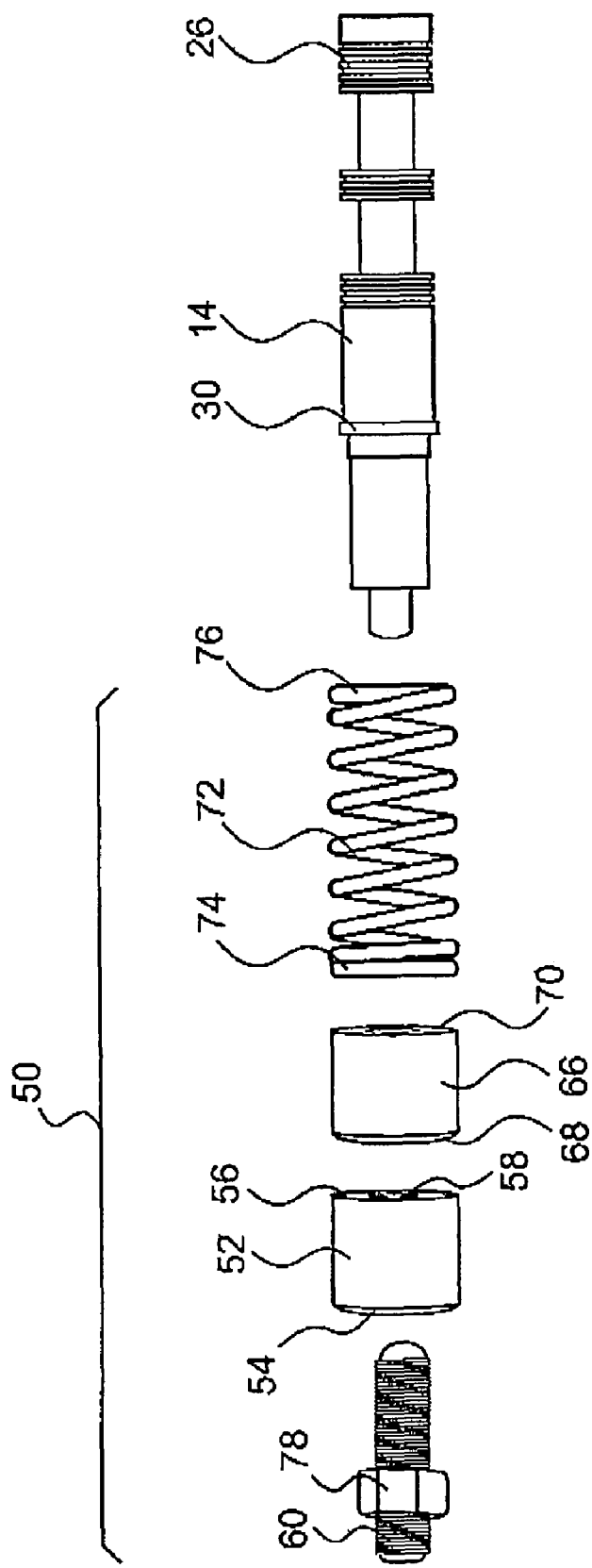
FIG. 4 is an exploded view of the line pressure regulating system of the present invention and the standard line pressure valve shown in FIG. 1.
Figure 5:
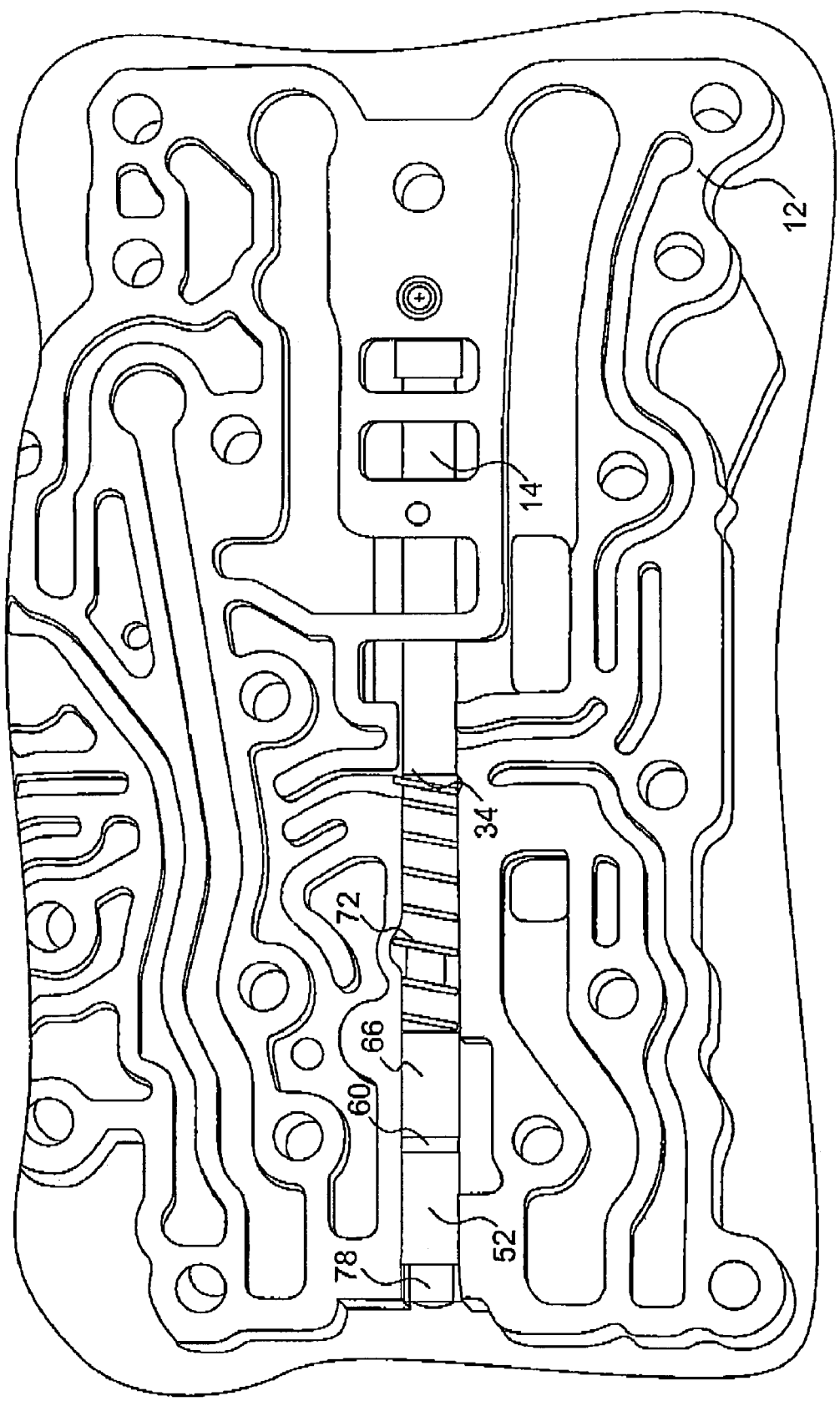
FIG. 5 is a partial sectional view of a valve body of a Powerglide® automatic transmission with the line pressure regulating system of the present invention and the line pressure valve installed.
Figure 6:
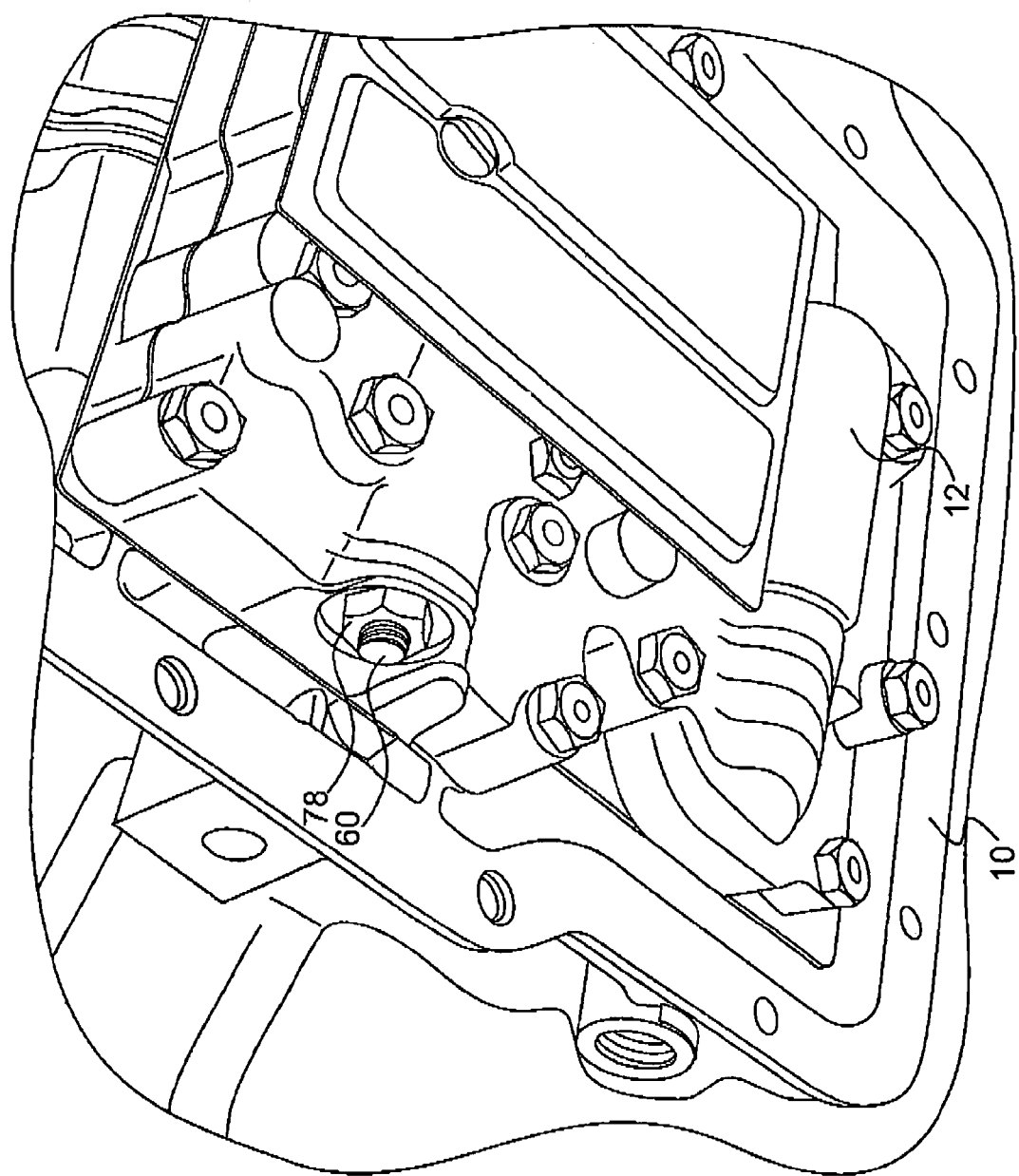
FIG. 6 is a partial perspective view of a Powerglide® automatic transmission with the oil pan removed, showing the line pressure regulating system of the present invention installed in the valve body.

The line pressure regulating system 50 of the present invention includes a first body 52 of generally cylindrical shape having a first side 54, a second side 56 and a threaded bore 58 passing through the first body 52 from the first body first side 54 to the first body second side 56. A threaded adjuster 60 is threadingly engaged with the threaded bore 58 and can be threaded into and out of the threaded bore 58 to change the axial position of the threaded adjuster 60 with respect to the first body 52. The threaded adjuster 60 has a first end 62 exposed to an exterior of the valve body 12, allowing for rotation of the threaded adjuster 60 from the exterior of the valve body (see FIG. 6). The first end 62 of the threaded adjuster 60 can be provided with a hex configuration, hex socket configuration, slotted configuration, or other types of configurations for being engaged by a wrench, hex key, screwdriver, Torx® driver or other type of hand tool to assist in manually rotating the threaded adjuster 60. The threaded adjuster 60 also has a second end 64 facing an interior of the valve bore 40 for engaging an opposing first side 68 of second body 66 of generally cylindrical shape.

The second body 66 also has a second side 70 facing an interior of the valve bore 40. A spring 72 is positioned between the second side 70 of the second body 66 and the spring retainer 30 of the line pressure valve 14. The spring 72 has a first side 74 for engaging the second side 70 of the second body 66 and a second side 76 for engaging the spring retainer 30 of the line pressure valve 14. A preload spacer such as preload spacer 36 can be positioned between the spring 72 and either the second body 66 or the spring retainer 30, but such is not the preferred embodiment. A lock nut 78 engaging the threaded adjuster 60 can be rotated to jam against the first body 52 to lock the threaded adjuster in place once the desired adjustment of the threaded adjuster 60 has been made. Alternative mechanisms, such as other types of frictional locks or chemical bonding fluids, can be used to lock the threaded adjuster 60 in place.

In a preferred embodiment, the first body 52 is generally symmetrically shaped from side to side so that the threaded adjuster 60 can be installed from either side to ease assembly. The second body 66 is also preferably symmetrically shaped from side to side so that it similarly can be installed in the valve bore 40 from either side to ease assembly. The first body 52 is preferably shaped so as to substantially block off the hydraulic boost circuit as such hydraulic boost circuit is not used for adjusting the line pressure with the present invention pressure regulating system 50. The first body 52 can be provided with one or more circumferential seals, such as o-rings, for example, on its exterior surface, to assist in this blocking function. The first body 52 can also be provided with a mechanical rotation-preventing device, such a frictional lock, a tab and slot arrangement, etc, to positively lock the first body 52 against rotation in the valve bore 40 when the threaded adjuster 60 is being adjusted.

The second body 66 preferably has a recessed seat 80 on each side for receiving and engaging the threaded adjuster 60. Such recessed seat 80 assists in keeping the threaded adjuster 60 axially aligned with the second body 66 and valve bore 40. The second body 66 also preferably has a bleed port 82 passing from the first side 68 to the second side 70 to allow any hydraulic fluid from the boost circuit that leaks past the first body 52 to escape through the second body 66 and return to the transmission oil pan without hydraulically pressurizing the space between the first body 52 and second body 66. A retaining ring 38 maintains the pressure regulating system 50 of the present invention in the valve bore 40. The bodies can be constructed of metal, such as aluminum or steel, a heat and oil tolerant plastic, or other appropriate material.

The pressure regulating system 50 of the present invention operates in the following manner. The hydraulic boost circuit is no longer used to adjust the line pressure. Rather, the pressure regulation is purely via adjustment of the spring 72. In that respect, since the spring 72 must provide all of the resistive force, it has a significantly higher spring rate than a conventional spring 32 and preferably omits use of any pre-load spacers so that the entire range adjustment can be made purely through rotation of the threaded adjuster 60. The lock nut 78 is loosened with respect to the first body 52 and the threaded adjuster is rotated in or out to adjust the axial position of the threaded adjuster 60 with respect to the first body 52. Since the second end 64 of the threaded adjuster 60 also engages the second body 66, movement of the axial position of the threaded adjuster 60 also changes the axial position of the second body 66 and thus, the pre-load on the spring 72 engaging the other side of the second body 66. That is, rotating the threaded adjuster 60 to move it axially inward in the valve bore 40 moves the second body 66 axially inward, thereby compressing the spring 72 to increase the resistive force on the line pressure valve 14, which in turn, increases the line pressure, as described above. Correspondingly, rotating the threaded adjuster 60 to move it axially outward in the valve bore 40 also moves the second body 66 axially outward, thereby decreasing compression of the spring 72 to decrease the resistive force on the line pressure valve 14, which in turn, decreases the line pressure, as described above.

There are several advantages to the line pressure regulating system 50 of the present invention. First, the entire adjustment range is accessible without exchange of any components merely by adjusting the position of the threaded adjuster 60. Second, since the first end 62 of the threaded adjuster 60 and the lock nut 78 are readily accessible from an exterior of the valve body, the line pressure can be adjusted while the valve body 12 is installed on the transmission 10. The valve body 12 need not be disassembled, removed from the transmission 10, nor need the transmission 10 be removed from the vehicle for adjustment. In fact, because of the accessibility and ease of adjustment, the adjustment can even be made through an access port provided in the transmission oil pan while the transmission oil pan is still installed on the transmission. This ease of adjustment makes for much easier dialing in of the proper adjustment while the transmission is being assembled/tested on a test rig, and also allows for fine tuning once the transmission is installed in the vehicle. It also allows for adjustment by the vehicle mechanic/owner using only basic hand tools without requiring a supply of assorted replacement components.

Further, since the pressure is adjusted solely by moving the threaded adjuster 60, the line pressure can be dialed in precisely to any point in the operating range merely through movement of the threaded adjuster 60 and doesn't present circumstances as in the conventional system where there are steps or gaps within the range of adjustment caused by the digital nature of the replacement of components from a finite set of components. Also, since the hydraulic boost circuit, boost sleeve 18 and boost valve 20 are not used with the present invention, there is no chance of the boost valve freezing in the boost sleeve due to contamination or another cause and thereby altering the pressure adjustment and requiring disassembly of the valve body.

The invention also includes the method of adjusting the line pressure as disclosed above.

Any of the various aspects of the invention can be combined in different manners to create different embodiments.

What is claimed is:

1. An automatic transmission hydraulic line pressure regulator, comprising:
    a spring having a first end and a second end, the second end for engaging a portion of a line pressure valve installed in a valve bore of a valve body of the automatic transmission and axially movable, under influence of the line pressure exposed to a portion of the line pressure valve opposite the portion engaging the spring, between a closed position in a direction away from the spring and an open position in a direction toward the spring, the spring resisting an opening force exerted on the line pressure valve by the line pressure and movement of the line pressure valve from the closed position;
    a first body for installation and removable fixation in the valve bore distant from the line pressure valve, the first body having a first side positioned toward an exterior of the valve body and a second side positioned toward an interior of the valve body, the first body having a threaded bore passing through the first body from the first body first side to the first body second side;
    a threaded adjuster axially engaged in the threaded bore of the first body and rotationally adjustable with respect to the first body to alter an axial position of the threaded adjuster with respect to the first body, a first end of the threaded adjuster being accessible from an exterior of the valve body for rotational adjustment;
    a second body for installation in the valve bore between the threaded adjuster and the spring and having a first side for engaging a second end of the threaded adjuster and a second side for engaging the first end of the spring;
    wherein, rotational adjustment of the threaded adjuster with respect to the first body also alters both an axial position of the second body and an axial position of the first end of the spring, thereby altering a pre-load on the spring to alter a resistive force against movement of the line pressure valve caused by the line pressure, such that increasing the pre-load on the spring by inward axial movement of the threaded adjuster increases the line pressure because the line pressure valve is prevented from opening and bleeding off further line pressure until the line pressure has increased to a level that the opening force can overcome the increased spring resistive force to open the pressure valve, and correspondingly, decreasing the pre-load on the spring by outward axial movement of the threaded adjuster decreases the line pressure.

2. The automatic transmission hydraulic line pressure regulator of claim 1, and further comprising a lock nut for locking the position of the threaded adjuster with respect to the first body.

3. The automatic transmission hydraulic line pressure regulator of claim 1, wherein the second body includes a bleed port passing from the second body first side to the second body second side to allow pressurized fluid to bleed from the second body first side to the second body second side and then to an exhaust port connected to the valve bore.

4. The automatic transmission hydraulic line pressure regulator of claim 1, wherein the second body includes a recessed seat on the second body first side for receiving and engaging the second end of the threaded adjuster.

5. The automatic transmission hydraulic line pressure regulator of claim 4, wherein the second body also includes a recessed seat on the second body second side adapted for receiving and engaging the second end of the threaded adjuster, and the second body first side is also constructed and arranged to engage the first end of the spring so that the second body can be operably installed from either side first into the valve bore.

6. The automatic transmission hydraulic line pressure regulator of claim 4, wherein the first side and the second side of the second body are generally operationally symmetrical so that the second body can be operably installed from either side first into the valve bore.

7. The automatic transmission hydraulic line pressure regulator of claim 1, wherein an exterior surface of the first body is constructed and arranged, when the first body is positioned in the valve bore, to block a boost pressure port in the valve bore and substantively prevent fluid flow through the boost port.

8. The automatic transmission hydraulic line pressure regulator of claim 1, wherein the first side and the second side of the first body are generally operationally symmetrical so that the threaded adjuster can be installed from either side and the first body can be operably installed from either side first into the valve bore.

9. The automatic transmission hydraulic line pressure regulator of claim 1, wherein the first body is retained in the valve bore by a retaining ring engaging the valve bore.

10. The automatic transmission hydraulic line pressure regulator of claim 1, wherein the first body includes an anti-rotation device engaging the valve body to prevent rotation of the first body during adjustment of the threaded adjuster.

11. The automatic transmission hydraulic line pressure regulator of claim 1, and further comprising the valve body.

12. The automatic transmission hydraulic line pressure regulator of claim 1, and further comprising the automatic transmission.

13. The automatic transmission hydraulic line pressure regulator of claim 12, wherein the threaded adjuster is accessible for adjustment from an exterior of an oil pan of the transmission, via an access port in the oil pan.

14. The automatic transmission hydraulic line pressure regulator of claim 1, wherein an exterior surface of the first body is constructed and arranged, when the first body is positioned in the valve bore, to block a boost pressure port in the valve bore and substantively prevent fluid flow through the boost port.

15. The automatic transmission hydraulic line pressure regulator of claim 14, wherein the first side and the second side of the first body are generally operationally symmetrical so that the threaded adjuster can be installed from either side and the first body can be operably installed from either side first into the valve bore.

16. The automatic transmission hydraulic line pressure regulator of claim 15, wherein the second body includes a bleed port passing from the second body first side to the second body second side to allow pressurized fluid to bleed from the second body first side to the second body second side and then to an exhaust port connected to the valve bore.

17. The automatic transmission hydraulic line pressure regulator of claim 16, wherein the second body includes a recessed seat on the second body first side for receiving and engaging the second end of the threaded adjuster.

18. The automatic transmission hydraulic line pressure regulator of claim 17, wherein the second body also includes a recessed seat on the second body second side adapted for receiving and engaging the second end of the threaded adjuster, and the second body first side is also constructed and arranged to engage the first end of the spring so that the second body can be operably installed from either side first into the valve bore.

* * * * *